United States Patent
Carder et al.

[15] 3,675,798
[45] July 11, 1972

[54] CONTAINER TRANSPORTER APPARATUS

[72] Inventors: Victor H. Carder, Carmel; Kenneth L. Cook, Salinas, both of Calif.

[73] Assignee: Cochran Western Corporation, Salinas, Calif.

[22] Filed: July 29, 1970

[21] Appl. No.: 59,143

[52] U.S. Cl. ............................................. 214/84, 193/38
[51] Int. Cl. ............................................. B60p 1/52
[58] Field of Search ................... 214/84, 85, 516, 517, 518

[56] References Cited

UNITED STATES PATENTS

| | | | |
|---|---|---|---|
| 1,693,607 | 12/1928 | Kellett | 214/38.8 |
| 635,300 | 10/1899 | Condict | 214/38.2 X |
| 718,543 | 1/1903 | Starus | 214/16.42 |
| 2,127,058 | 8/1938 | Fitch | 214/516 |
| 3,561,625 | 2/1971 | Dioguardi | 214/84 |
| 3,504,636 | 4/1970 | Adler | 214/38.8 X |
| 1,243,636 | 10/1917 | Schulz | 214/516 |

*Primary Examiner*—Gerald M. Forlenza
*Assistant Examiner*—Frank E. Werner
*Attorney*—Flehr, Hohbach, Test, Albritton & Herbert

[57] ABSTRACT

Apparatus for loading, transporting and unloading containers of the pre-loaded pod type. A transporter trailer is provided including a mobile main frame, conveyor means to move a container to and from a transport position, container hold-down means engaging grooves on the container sides and adapted to accomodate container misalignment during loading, container stops spaced apart along the length of the conveyor, and transfer ramps at the conveyor ends. For loading from a selected end a container is pushed onto a normally lowered transfer ramp and moved over the associated container stop which is depressed until the container is locked in transport position. Operating means are provided to lower a selected container stop and raise its associated transfer ramp to an upwardly inclined position for unloading the container.

14 Claims, 9 Drawing Figures

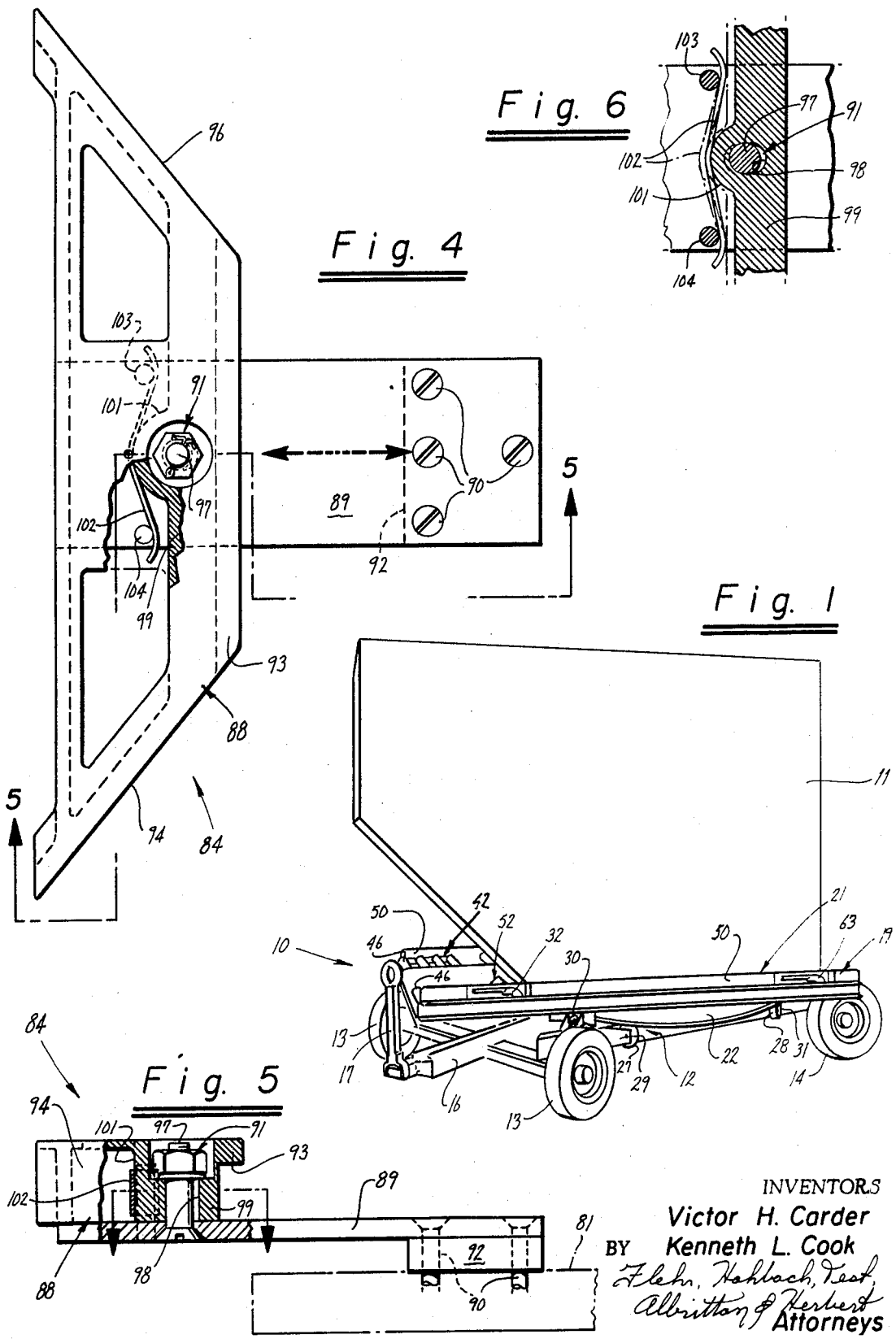

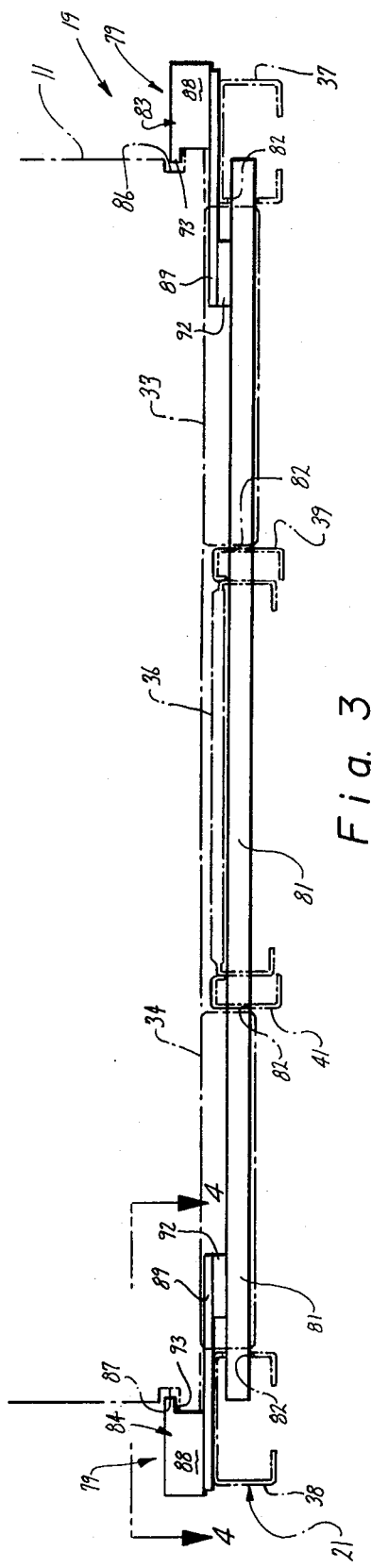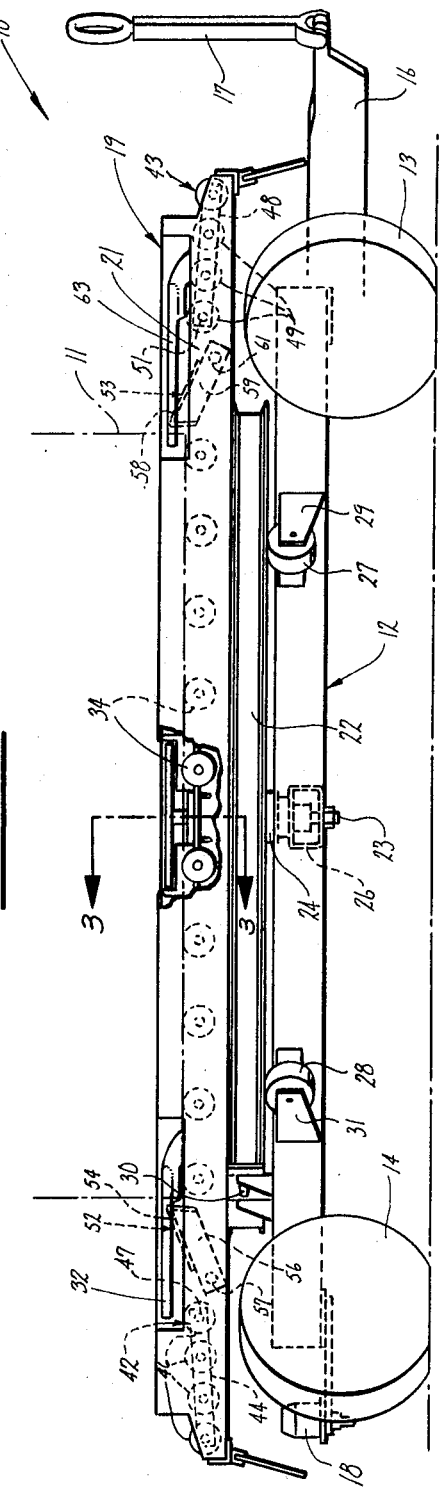

INVENTORS
Victor H. Carder
Kenneth L. Cook
BY
Fleh, Hohbach, Test,
Albritton & Herbert
Attorneys

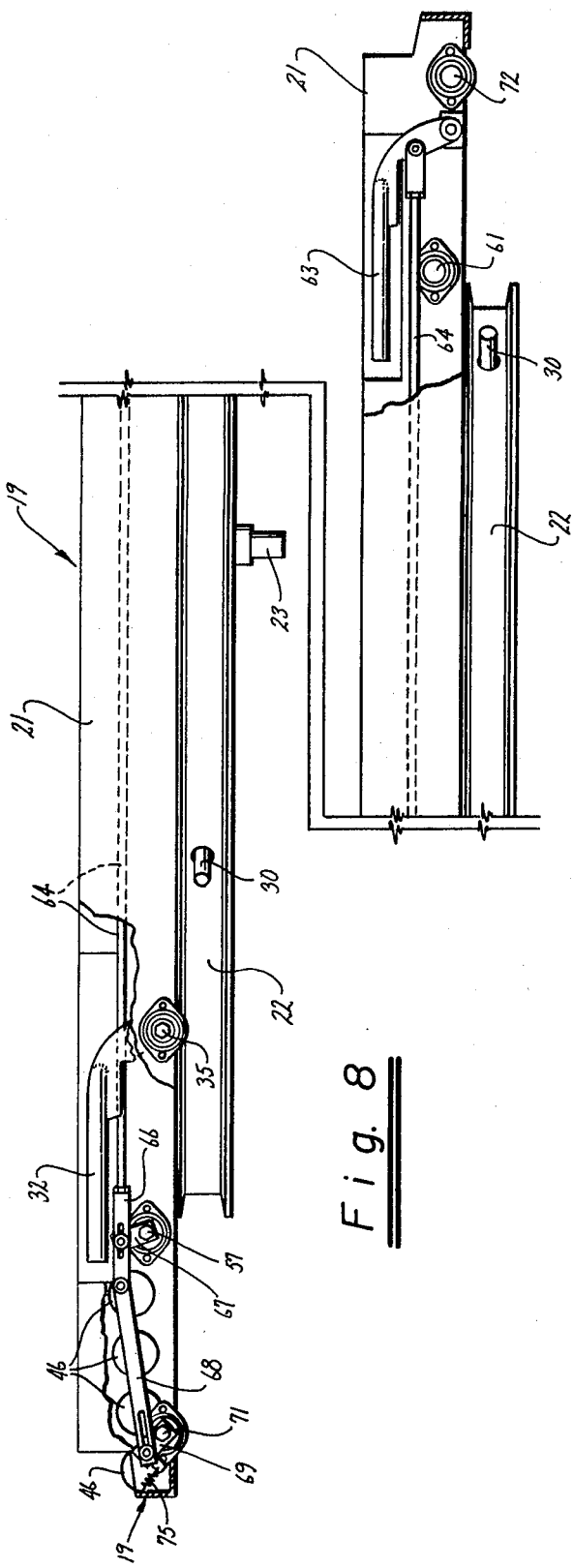
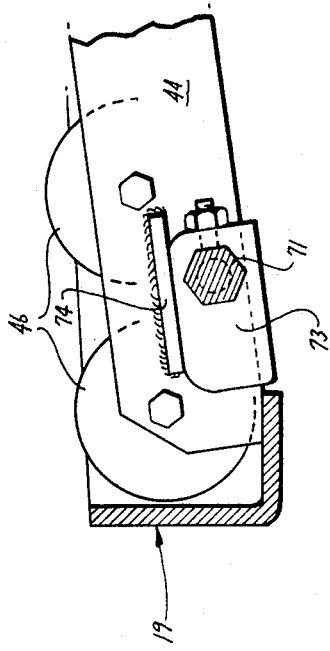

CONTAINER TRANSPORTER APPARATUS

BACKGROUND OF THE INVENTION

This invention relates to apparatus for transporting containers, and more particularly relates to transporter trailers adapted for loading, transporting and unloading containers of the pre-loaded pod type.

Container transporters of the type described have been used for applications such as handling the containerized cargo pods used in the aircraft industry. These pods contain baggage, mail and other items of cargo and have been developed to speed up the loading and unloading of aircraft. The trailers are used to load or unload the cargo pods or containers at the terminal for movement to and from the aircraft. A tractor commonly is provided to pull a plurality of the loaded trailers in a train. The need has been recognized for a transporter apparatus which provides fast and efficient container handling with minimum manpower requirements. The transporter should easily receive the container even when it is loaded with some misalignment or skewing with respect to the transporter axis, should lock and securely hold down the container when in the transport position, and yet afford ready release of the container for unloading.

SUMMARY OF THE INVENTION AND OBJECTS

It is an object of the invention to provide apparatus for the loading, transporting and unloading of containers of the pre-loaded pod type and the like.

Another object is to provide transporter apparatus of the type described which is of simplified construction and operation and affords fast and efficient handling of containers with minimum manpower requirements.

Another object is to provide container transporter apparatus of the type described adapted to move a container to and from a transport position on a mobile frame with a minimum of effort and which securely holds the container to the frame in the transport position.

Another object is to provide container transporter apparatus of the type described which affords a container hold-down arrangement accommodating loading of a container which may be slightly skewed or in off-center alignment.

Another object is to provide container transport apparatus of the type described affording transfer ramps at either end of a container conveyor with the ramps adapted to move to a downwardly inclined position for container loading and to an upwardly inclined position for unloading, together with container stops operating conjointly with the transfer ramps for restraining container movement from the transport position and to release a selected end of the container for unloading.

BRIEF DESCRIPTION OF THE DRAWINGS

FIG. 1 is a perspective view of a container transporter apparatus incorporating features of the invention and with a pod type container in the transport position;

FIG. 2 is a partially cut-away side elevational view to an enlarged scale of the transporter apparatus of FIG. 1;

FIG. 3 is a cross sectional view taken along the line 3—3 of FIG. 2;

FIG. 4 is a partial top plan view taken along the line 4—4 of FIG. 3;

FIG. 5 is a cross sectional view taken along the line 5—5 of FIG. 4;

FIG. 6 is a cross sectional view taken along the line 6—6 of FIG. 5;

FIG. 8 is a side elevational view of FIG. 7; and

FIG. 9 is a cross sectional view taken along the line 9—9 of FIG. 7.

DESCRIPTION OF THE PREFERRED EMBODIMENT

Figure 7:
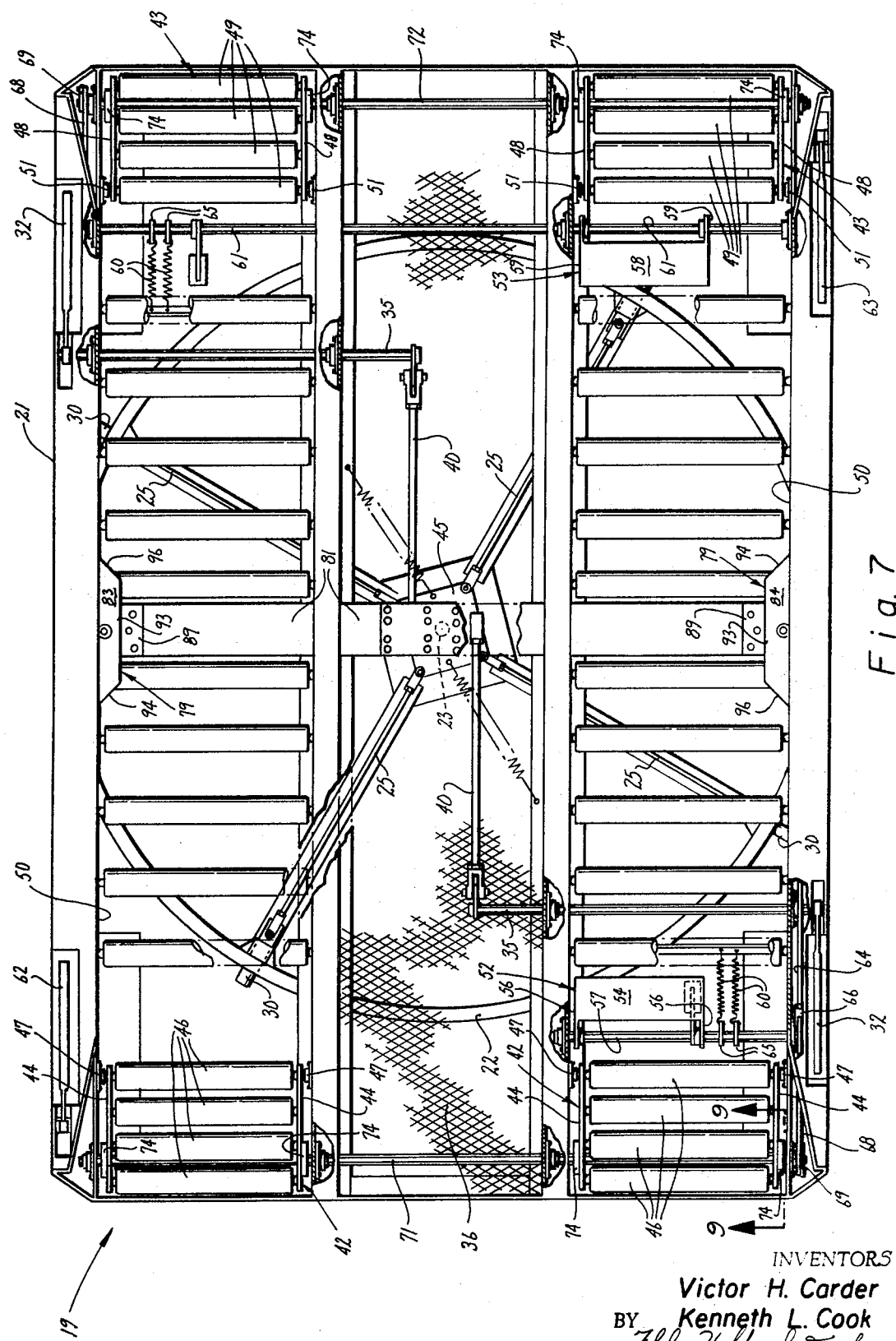
FIG. 7 is a top plan view of the roller bed of the transporter apparatus.

In the drawings, FIGS. 1 and 2 illustrate generally at 10 a container transporter apparatus for loading, transporting and unloading containers such as the preloaded pod 11 of the type used for the handling of cargo for aircraft. Transporter apparatus 10 is adapted to easily load and unload pods 11 for transport between the terminal and the aircraft by means of a tractor pulling a plurality of the transporters in a train.

Transporter apparatus 10 comprises a mobile main frame 12 supported by front and rear pairs of wheels 13,14. Running gear assembly 16 and tow bar 17 are provided for pulling the transporter in a train. Suitable steering linkages, not shown, are employed under the main frame to provide four wheel steering for tracking. A coupler assembly 18 is provided at the rear of the main frame for coupling with the tow bar of a trailing transporter. Conventional parking brakes are provided to brake the wheels automatically when the tow bar is raised.

A roller bed assembly 19 is provided on the main frame to function as a conveyor means for loading and unloading container 11 to and from its transport position as illustrated in FIGS. 1 and 2. This assembly includes a roller frame 21 mounted on a circular turntable 22 which in turn is mounted for vertical rotation about a pivot shaft 23 and flange bearing assembly 24 mounted on a transverse box channel member 26 of the main frame. Turntable 22 is rotatably supported at its outer periphery by four rollers 27,28 mounted to the main frame for rotation about radial axes by means of brackets 29,31. This mounting arrangement affords 360° rotation of the turntable with four releasable indexing pins or stops 30 provided on the roller bed assembly at 90° angular spacing to afford selective positioning of the roller bed for receiving and discharging the containers. Turntable operating means are provided on either side of the roller bed, each of which comprises an operating handle 32, rocker shaft 35, and rod 40 connected with a common turntable swing plate 45 which is spring loaded and in operating connection with four actuating rods 25 coupled to the inside ends of respective pins 30. Elevation of either handle 32 functions to actuate the pins 30 to unlock the turntable with respect to pin sockets on the main frame at each position, and release of the handles returns the pins for again locking the turntable.

The conveyor means on roller bed assembly 19 comprises a plurality of laterally axised main rollers 33,34 arranged in a pair of spaced apart paths separated by a depressed non-skid walkway 36, best illustrated in FIG. 3. Rollers 33 and 34 are mounted by suitable bearing means between outer longitudinally extending channels 37,38 and inner channels 39,41. Each end of the conveyor is provided with a transfer ramp assembly 42,43 adapted to facilitate loading and unloading of the container to and from the main rollers. Transfer ramp 42 comprises two spaced apart frames 44 each with four rotatably mounted rollers 46. The frames 44 are pivotally mounted to the roller bed frame at bearings 47. At the other end of the conveyor transfer ramp 43 comprises two spaced apart frames 48 each with four rotatably mounted rollers 49. The frames 48 are pivotally mounted to the roller bed frame at bearings 51. Each of the transfer ramps 42,43 operate between an upwardly and outwardly inclined or angular position when a container is unloaded over that end of the roller bed, and to an approximately equal downwardly and outwardly inclined position providing an incline for loading a container. The transfer ramps are moved to their upwardly inclined positions during unloading to compensate for the severe tire deflection on a side of the trailer resulting from the off-center loading condition occuring upon unloading to the trailer side.

A container moving on the conveyor is guided to and from the transport position by a pair of side rails 50 integral with the roller bed frame.

The roller bed is further provided with a pair of container stops 52,53 at opposite ends of the roller conveyor. Container stop 52 comprises a wedge-shaped plate 54 secured between end plates 56 and pivotally mounted to the roller bed by means of a torsion shaft 57. Similarly, container stop 53 comprises a wedge-shaped plate 58 secured between a pair of end plates 59 and pivotally mounted to the roller bed by means of a torsion shaft 61. The container stops are yieldably biased to a raised position by means of tension spring pairs 60 connected to bellcranks 65 secured to respective torsion shafts. In the raised positions the stops function to retain a container in the transport position.

For unloading, a selected stop is operated to its lowered position, and the associated transfer ramp is raised by means of manually lifting one of the actuating handles 62,63 mounted on the roller bed at an end opposite that of the selected stop. Each container stop and associated transfer ramp conjointly and simultaneously move to respective lowered and raised positions with the operating handles up, and are adapted to return to respective raised and lowered positions with the operating handles down. The identical operating mechanisms for the ramp/stop pairs are housed within respective side rails 50, and it will suffice to describe only the mechanism controlled by handle 63. Handle 63 operates through a rod 64 connected with a slotted yoke 66 which defines a lost-motion connection with its associated stop through bellcrank 67 secured to the torsion shaft 57. This lost-motion connection permits an on-loading container to move onto and depress a stop without the associated ramp being raised by the stop.

Transfer ramp 42 is operated through a rod 68 connected between yoke 66 and bellcrank 69 secured to laterally positioned torsion shaft 71. A similar torsion shaft 72 is provided for operating the opposite ramp 43. A pin and slot connection is provided between yoke 66 and bellcrank 69 to provide a lost-motion connection affording freedom of movement for a ramp when its operating handle is lowered. With a handle raised its associated ramp is raised through the exemplary camming arrangement of FIG. 9. A plurality of laterally spaced cams 73 are secured to shaft 71 below plural rubbing blocks 74, each welded to the side of a ramp frame 44. Clockwise rotation of shaft 71, as viewed in FIG. 9, responsive to the handle being raised results in the cams 73 turning against blocks 74 and raising the outer end of transfer ramp 42. A retainer spring 75 is connected between roller bed 19 and the end of ramp frame 44.

With an actuating handle raised yoke 66 moves inwardly conjointly pivoting both of the shafts 57,71 to move container stop 52 to the lowered position while bringing the transfer ramp 42 to the raised, angular position. At this time a loaded container on the roller bed may be pushed forward over the container stop and onto the transfer ramp. When the container overlys the stop and transfer ramp its weight will retain these elements in respective lowered, upwardly inclined positions so that the actuating handle may be released until container transfer is completed. After the container clears the transfer ramp the force of the springs 60 returns the container stop to the raised position while gravity drops the transfer ramp to its downwardly inclined position ready for subsequent loading. During on-loading a container moving over the incline of a transfer ramp depresses the container stop to its lowered position. After the container moves onto the main rollers and reaches the transport position the stops spring back to raised position. Both stops are now raised to securely restrain the container from lengthwise movement until unloading is initiated.

As the container moves over the conveyor rollers into the transport position it engages hold-down means 79 which function to securely hold the container at its lower side edges to roller bed 19. Hold-down means 79 includes a hold-down frame 81 mounted for lateral movement across the path of container travel. The lateral range of travel of the hold-down means is limited by the two side rails 50. Frame 81 preferably comprises a V-shaped channel member slidably mounted through corresponding aligned V-shaped openings 82 provided in frame members 37,38,39,41. A pair of laterally spaced apart guide assemblies 83,84 are mounted at opposite ends of frame 81 for sliding engagement with longitudinally extending grooves 86,87 formed at the lower edges of the sidewalls of container 11.

The two guide assemblies 83,84 are similar in construction and operation and it will suffice to describe in detail assembly 84 of FIGS. 4-6. This guide assembly comprises a guide head 88 mounted on flat plate 89 through a pin and slot connection 91. Plate 89 in turn is mounted on the outer end of hold-down frame 81 by suitable fasteners 90 secured through a bar 92.

Guide head 88 includes cooperative locking means comprising a longitudinally extending, inwardly projecting flange 93 spaced above plate 89 for registry with container groove 87. A pair of inclined side walls 94,96 are formed on the head for engagement with the leading side edge of a container moving on the conveyor towards the transport position. If the container is misaligned or skewed the action of its leading edge striking an inclined side wall of the gripping head functions to laterally shift hold-down frame 81 permitting engagement of the grooves on both sides of the container with the corresponding flanges 93.

The pin and slot connection 91 comprises a pin or bolt 97 projecting through elongate slot 98 formed in web 99 of the guide head. A rounded bearing surface 101 provided on web 99 projects outwardly from pin 97. A leaf spring 102 mounted within the guide head between a pair of studs 103,104 bears against the surface 101 and yieldably centers it so that flange 93 is normally aligned with the path of container travel. Head 88 is free to tilt about pin 97 within a range of substantially 5° from its centered position as the container edge moves into engagement with the head. The lateral travel of head 88 through pin and slot connection 91 is substantially within the range of 3/16 inch.

The use and operation of transport apparatus 10 is as follows. Prior to loading a container actuating handles 62,63 are both in their lowered positions permitting the associated container stops 53,54 to be biased to the raised position and the transfer ramps 42,43 to be biased to the lowered, downwardly inclined position. As a container is moved onto one end of the roller bed, for example the left end of FIG. 7, it will move upwardly over transfer ramp 42, depress container stop 52, and move forwardly on the rollers towards the transport position. Where the container may be out of longitudinal alignment or skewed as it rolls forward the container edge closest to the edge of the roller frame will strike the guide head on that side and shift the hold-down frame sideways sufficient to permit both grooves of the container to move into registry with the corresponding flanges 93. The container continues its movement until reaching container stop 53, and this is followed by trailing stop 52 returning by spring action to its raised position locking the container in the transport position. After the transporter has been moved to the unloading location the roller bed may be aligned for discharging the container by raising one of the operating handles 32 and swinging turntable 22 relative to the main frame. To unload the container the operator raises one of the actuating handles at the end opposite the desired discharge end, for example handle 63 where it is desired to discharge the container from the left end as viewed in FIG. 7. Actuation of handle 63 depresses stop 52 to its lowered position position while simultaneously elevating transfer ramp 42 to its upwardly inclined position. Container 11 is then pushed across the rollers and the weight of the container riding on stop 52 holds the stop and ramp 42 in position until the stop is cleared. As the container leaves the transporter the stop returns to its raised position and the ramp drops to its inclined position for receiving the next container.

In view of the foregoing description, it is clear that there has been provided herein a new and improved transport apparatus for handling containers of the pre-loaded pod type. While the embodiment herein is at present considered to be preferred, it will be understood that numerous variations and modifications may be made therein by those skilled in the art, and it is intended to cover in the appended claims all such variations and

We claim:

1. Apparatus for loading, transporting and unloading containers, comprising the combination of a mobile main frame, conveyor means on the main frame to move a container to and from a transport position thereon, container hold-down means on the main frame to engage and hold the container with respect to the main frame, a pair of transfer ramps, each ramp positioned at a respective end of the conveyor means and comprising a conveyor mounted for movement between a first position inclined outwardly and downwardly for loading of the container and a second position inclined outwardly and upwardly with said conveyor means for unloading of the container, a pair of container stops spaced apart longitudinally substantially the length of the container, each stop pivotally mounted on the main frame at a respective end of the conveyor for movement between a raised position stopping outward travel of a container and a lowered position permitting unloading of the container from said respective end, and operating means adapted to move a selected container stop to its lowered position and its associated transfer ramp to its second position for unloading a container from said transport position.

2. Apparatus as in claim 1 wherein the container hold-down means comprises a hold-down frame mounted for lateral translatory movement within a range of travel with respect to the path of container travel on the conveyor to accomodate container misalignment and skewing during loading thereon, and a pair of spaced apart guide assemblies, each guide assembly mounted on an end of the hold-down frame to engage a respective container side for restraining the container in said transport position.

3. Apparatus as in claim 2 wherein the container is formed with a pair of longitudinally extending grooves formed along the lower edges of respective container sides, and wherein each of the guide assemblies includes an inwardly projecting, longitudinally extending flange adapted for interfitting engagement with a corresponding container groove.

4. Apparatus for loading, transporting and unloading containers comprising the combination of a mobile main frame, conveyor means on the main frame to move a container to and from a transport position thereon, container stop means adapted to releasably hold the container on the conveyor in said transport position, and container hold-down means including a pair of guide assemblies spaced apart substantially the width of a container, each of said guide assemblies including cooperative locking means to releasably receive a respective container side and preclude vertical displacement of said container side with respect to said conveyor, and means to constrain the guide assemblies for lateral conjoint movement relative to the conveyor path within a range of travel to accommodate container misalignment and skewing during loading.

5. Apparatus as in claim 4 wherein the container is provided with longitudinally extending grooves at the lower edges of respective container sides, and each of said guide assembly locking means including an inwardly projecting flange in registry with a respective container groove for engagement therewith during container loading and transporting and disengagement therefrom during container unloading.

6. Apparatus as in claim 4 wherein each of said guide assemblies is mounted for pivotal movement about a vertical axis within a range of angular displacement to accomodate misalignment and skewing of the container during movement thereof to and from the transport position.

7. Apparatus as in claim 4 wherein said means constraining the guide assemblies comprises a hold-down frame mounted on the main frame for lateral movement within said range of travel, and each of the guide assemblies are mounted at a respective end of said hold-down frame.

8. Apparatus as in claim 4 wherein the guide assemblies each include a pair of sidewalls, each sidewall inclined outwardly across the path of container movement during loading providing an inclined camming surface against which the lower side edge of a misaligned or skewed container acts for moving the guide assemblies into alignment with said container sides.

9. Apparatus for loading, transporting and unloading containers, comprising the combination of a mobile main frame, a turntable mounted on the frame for rotation about an upright axis, conveyor means on the turntable to move a container to and from a transport position thereon, container stop means at respective ends of the conveyor means, each of the container stop means being mounted for movement between a raised position preventing movement of a container from the transport position over the respective conveyor end and a lowered position permitting container movement thereover, a pair of transfer ramps, each ramp positioned at a respective end of the conveyor means outwardly of its associated container stop means and mounted for movement between a first position inclined downwardly away from the conveyor means for loading of the container and a second position inclined upwardly away from the conveyor means for container unloading.

10. Apparatus as in claim 9 and further including operating means adapted to move a selected container stop means to its lowered position and its associated transfer ramp to its second position for unloading a container from the selected end of the conveyor.

11. Apparatus for loading, transporting and unloading containers, comprising the combination of a mobile main frame, conveyor means on the main frame to move a container to and from a transport position thereon, container stop means at respective ends of the conveyor means, each of the container stop means being mounted for movement between a raised position preventing movement of a container from the transport position over the respective conveyor end and a lowered position permitting container movement thereover, a pair of transfer ramps, each ramp positioned at a respective end of the conveyor means outwardly of its associated container stop means and mounted for movement between a first position inclined downwardly away from the conveyor means for loading of the container and a second position inclined upwardly away from the conveyor means for container unloading, operating means adapted to move a selected container stop to its lowered position and its associated transfer ramp to its second position for unloading a container from the selected end of the conveyor, each container stop means being yieldably biased to its raised position and each transfer ramp being movable, when said operating means is inactivated, to its first position whereby movement of a container toward the transport position from a selected end of the conveyor permits the respective container stop means to return to its raised position after it has been cleared by the container for locking the container in the transport position, and whereby unloading of a container from the transfer ramp permits the same to return to its first position.

12. Apparatus for loading, transporting and unloading containers, comprising the combination of a mobile main frame, conveyor means on the main frame to move a container to and from a transport position thereon, container stop means at respective ends of the conveyor means, each of the container stop means being mounted for movement between a raised position preventing movement of a container from the transport position over the respective conveyor end and a lowered position permitting permitting container movement thereover, a pair of transfer ramps, each ramp positioned at a respective end of the conveyor means outwardly of its associated container stop means and mounted for movement between a first position inclined downwardly away from the conveyor means for loading of the container and a second position inclined upwardly away from the conveyor means for container unloading, operating means adapted to move a selected container stop to its lowered position and its associated transfer ramp to its second position for unloading a container from the selected end of the conveyor, said operating means including means to move the transfer ramp associated with a container stop to said second position simultaneous with movement of the container stop to its lowered position whereby movement of a container over a depressed one of the container stops holds the associated transfer ramp in said second position until unloading of the container is completed.

13. Apparatus for loading, transporting and unloading containers, comprising the combination of a mobile main frame, conveyor means on the main frame to move a container to and from a transport position thereon, container stop means at respective ends of the conveyor means, each of the container stop means being mounted for movement between a raised position preventing movement of a container from the transport position over the respective conveyor end and a lowered position permitting container movement thereover, a pair of transfer ramps, each ramp positioned at a respective end of the conveyor means outwardly of its associated container stop means and mounted for movement between a first position inclined downwardly away from the conveyor means for loading of the container and a second position inclined upwardly away from the conveyor means for container unloading, operating means adapted to move a selected container stop means to its lowered position and its associated transfer ramp to its second position for unloading a container from the selected end of the conveyor, said operating means including a pair of actuating handles positioned at respective ends of the conveyor means, and means interconnecting a respective one of the handles for conjointly operating the container stop and transfer ramp at an opposite end of the conveyor means between said raised and lowered positions of the stop means and said first and second positions of the ramp.

14. Apparatus as in claim 13 wherein each of the actuating handles is mounted for movement between a lowered position operating its associated stop and ramp to respective raised and second positions, and to an elevated position operating its associated stop and ramp to a respective lowered and first position, and said means interconnecting the handles includes lost-motion connection means permitting movement of a container stop to its lowered position during container loading while its associated handle returns to its lowered position.

* * * * *